A. L. MAILLARD & L. H. CROOK.
SIGNAL.
APPLICATION FILED FEB. 7, 1913.

1,109,684.

Patented Sept. 8, 1914.
2 SHEETS—SHEET 1.

WITNESSES
H. C. Ackman Jr.
Frances E. McDade

INVENTORS
Albert L. Maillard
Louis H. Crook
P. H. Hoster
Attorney

A. L. MAILLARD & L. H. CROOK.
SIGNAL.
APPLICATION FILED FEB. 7, 1913.

1,109,684.

Patented Sept. 8, 1914.
2 SHEETS—SHEET 2.

WITNESSES

INVENTORS
Albert L. Maillard
Louis H. Crook
Attorney

UNITED STATES PATENT OFFICE.

ALBERT L. MAILLARD AND LOUIS H. CROOK, OF WASHINGTON, DISTRICT OF COLUMBIA.

SIGNAL.

1,109,684.

Specification of Letters Patent. Patented Sept. 8, 1914.

Application filed February 7, 1913. Serial No. 746,841.

*To all whom it may concern:*

Be it known that we, ALBERT L. MAILLARD, a subject of the King of Great Britain, and LOUIS H. CROOK, a citizen of the United States, residing at Washington, in the District of Columbia, have invented certain new and useful Improvements in Signals, of which the following is a specification.

The invention relates to signals and more particularly to that class of signals known as alarms and has for an object to provide a signal for producing the sounds of instruments and the like or for reproducing the voice.

The invention embodies, more particularly, a signal adapted for use on vehicles such as automobiles and the like or on motor boats and ships and wherein it is desired to provide a means whereby the voice or voices of a human being or beings can be reproduced to act as a signal, the device being also adapted for use in producing musical or other sounds.

The invention further embodies a device in which use is made of a record adapted to contain a wave line and similar in many respects to the usual phonograph record, the device being preferably electrically operated whereby, when the record is rotated, a stylus carried by a reproducer operates over the wave line to produce the desired sound.

Figure 1:
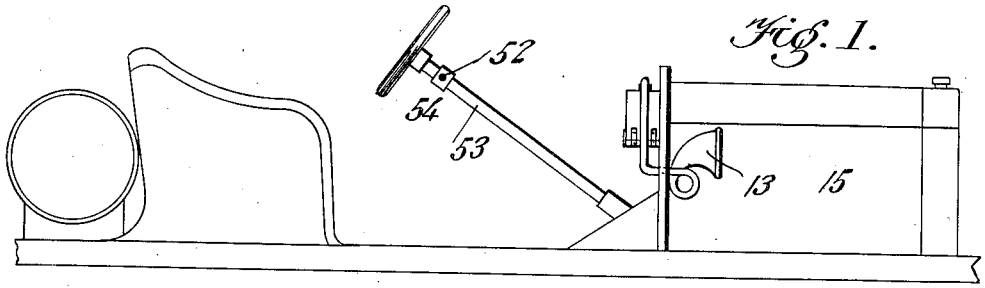
Figure 2:
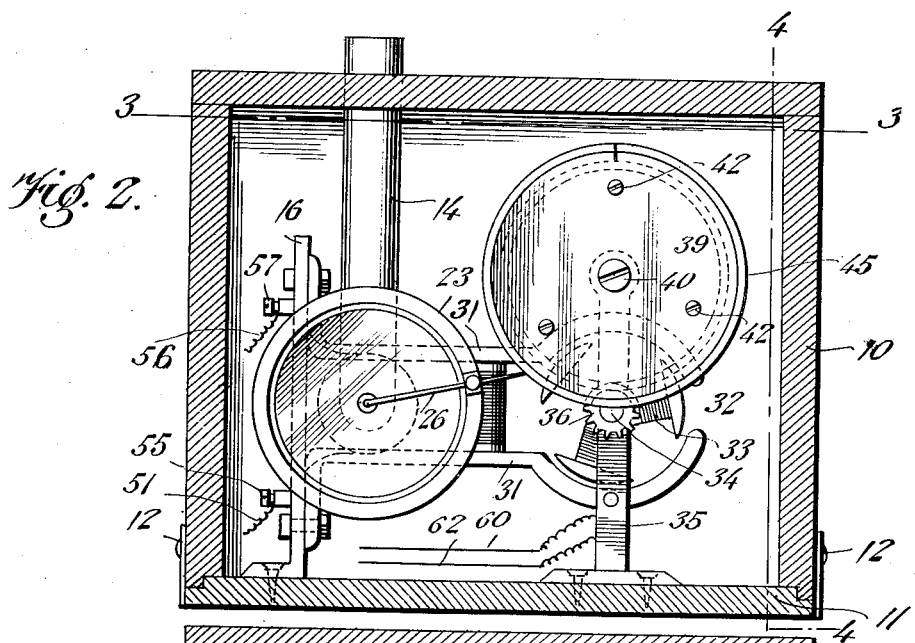
Figure 3:
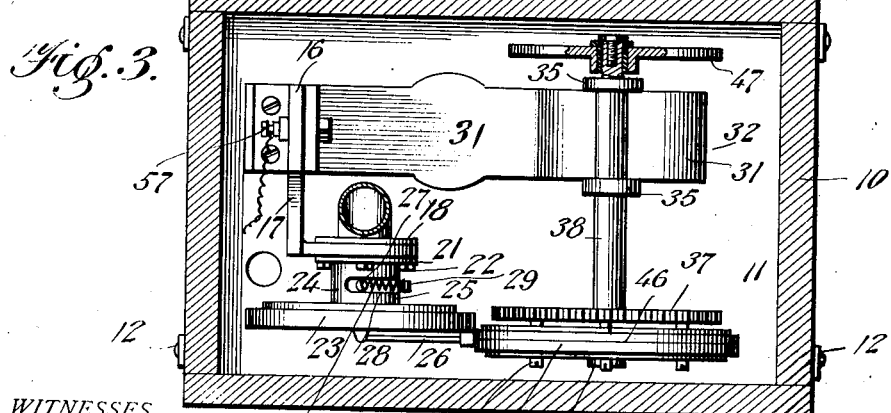
Figure 4:
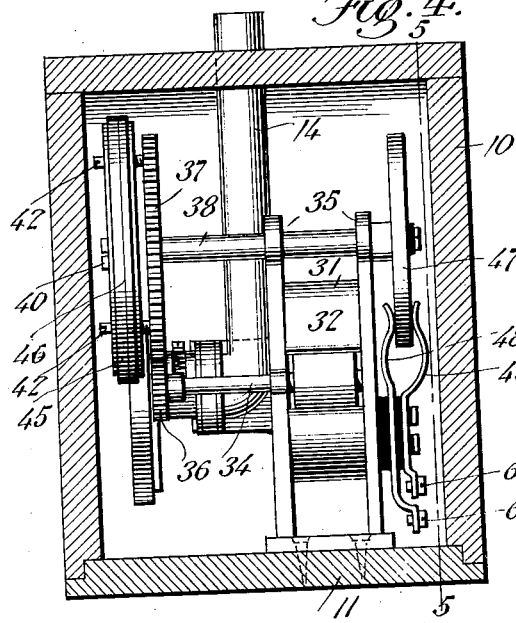
Figure 5:
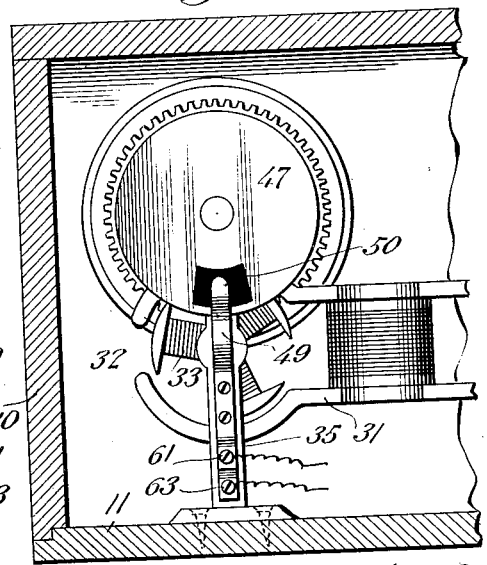
Figure 6:
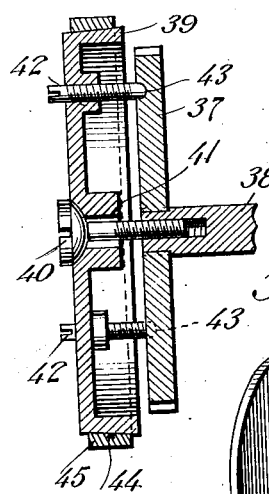
Figures 7, 8:
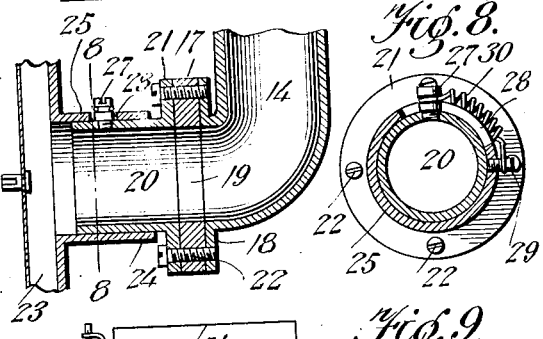
Figure 10:
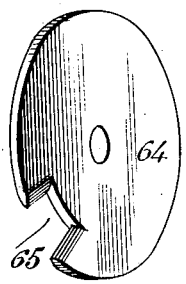
Figure 9:
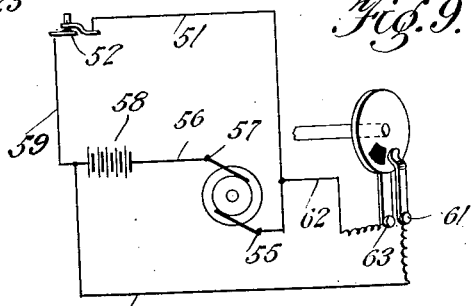

In the further disclosure of the invention reference is to be had to the accompanying drawings, constituting a part of this specification, in which similar characters of reference denote corresponding parts in all the views, and in which:

Figure 1 is a fragmentary side elevation of a vehicle having our device attached thereto; Fig. 2 is a vertical sectional view of the casing in which the signal is arranged, showing the various parts of the signal in side elevation; Fig. 3 is a horizontal sectional view of the casing, taken on the line 3—3 in Fig. 2, showing the various parts of the signal in plan; Fig. 4 is a vertical transverse sectional view of the casing, taken substantially on the line 4—4 in Fig. 2; Fig. 5 is a fragmentary vertical sectional view taken on the line 5—5 in Fig. 4; Fig. 6 is a fragmentary enlarged vertical sectional view of the drum, showing the record supported thereon; Fig. 7 is a fragmentary enlarged vertical sectional view, showing the manner of supporting the reproducer in position to convey sounds through the horn; Fig. 8 is a vertical transverse sectional view, taken on the line 8—8 in Fig. 7; Fig. 9 is a diagrammatic view, showing the electrical connection for the device; and Fig. 10 is a perspective view of a modified form of circuit closing member.

Referring to the views, we provide a casing 10 having the bottom thereof open and adapted to normally repose on a base 11 substantially rectangular in shape, suitable locking members 12 being supported on the lower end of the casing 10 and adapted to engage the base 11 to lock the casing 10 on the said base.

A horn 13 terminating in a reduced tubular stem 14 is adapted to be supported on a vehicle 15 disclosed in Fig. 1 and the tubular stem 14 of the horn 13 depends within the casing 10, as shown in Figs. 2 and 4. Secured to the base 11 is an upright 16 supporting a horizontal L-shaped bracket 17, and the lower end of the tubular stem 14 terminates in a circular flange 18 abutting against the bracket 17 and which is provided with an opening 19 registering with the opening to the lower end of the stem. A tubular supporting member 20 is provided with an integral circular flange 21 abutting against the other side of the bracket 17, with the opening to the tubular supporting member registering with the opening 19 in the bracket 17, suitable screws 22 being passed transversely through the flange 18, the bracket 17 and the flange 21 to rigidly connect the lower end of the tubular stem 14 to the bracket and rigidly support the member 20 on the bracket.

A phonograph reproducer 23 of any preferred type and including a casing 24 provided with a lateral sleeve 25 and supporting a stylus 26 is adapted to turn on the supporting member 20 without, however, having any longitudinal movement on the supporting member, and in order to accomplish this result, the reproducer 23 is first engaged with the supporting member 20 by having the sleeve 25 encircle the tubular portion of the supporting member, after which a screw 27 is passed transversely through a slot 28 formed in the sleeve 25, with the inner end of the screw extending into the tubular portion of the supporting member 20, thus rotatably supporting the reproducer 23 on the supporting member, while at the same time the reproducer will be prevented from moving longitudinally thereon by the screw 27 passing through the mentioned slot 28 in the sleeve 25 of the reproducer. A screw 29 is carried on the sleeve 25 of the reproducer and a contractile helical spring 30 has the ends thereof secured to the screws 27 and 29, as shown in Fig. 8, and for a purpose that will be hereinafter more fully disclosed.

Projecting forwardly and horizontally from the upright 16 are a plurality of brackets 31 constituting the field of a motor 32 including an armature 33 carried by a shaft 34 journaled in vertical uprights 35 secured to the base 11 and projecting upwardly on both sides of the free end of the brackets 31. An end of the shaft 34 projects beyond one of the uprights 35 and keyed on the said end of the shaft is a toothed wheel 36 meshing with a toothed wheel 37 carried on a horizontal shaft 38 journaled in the upper end of the uprights 35. A drum 39 is adapted to be adjustably supported on the body of the toothed wheel 37 and in order to accomplish this result a headed screw 40 is passed loosely through a central opening 41 in the drum 39 and has threaded connection with the shaft 38 carrying the toothed wheel 37, the opening 41 being of a sufficiently greater diameter than the diameter of the screw 40 so that the drum 39 will be loosely supported. Now in order to provide for an adjustment of the in disk with respect to the toothed wheel 37 and the shaft 38 a series of set screws 42 have threaded connection with the drum 39 and pass transversely therethrough, with the inner ends of the said screws extending into recesses 43 formed in the body of the toothed wheel 37. We preferably employ three of these adjusting screws 42, and it will be apparent that in this manner the drum 39 can be readily adjusted so as to rotate truly with the shaft 38. The periphery 44 of the drum 39 is preferably tapered and adapted to receive and support a cylinder record 45, as shown in Fig. 6, the said record having the usual wave line 46 and which, in this instance, is a single continuous line extending entirely around the record. Now referring to Figs. 2 and 3 it will be seen that the contractile action of the spring 30 holds the pointed end of the stylus 25, carried by the reproducer 23, against the record 45, the said spring being adapted to at all times exert an upward pull on the stylus and tend to rotate the reproducer toward the left so that the stylus will normally be held in engagement with the record. Now by providing the adjustment of the drum 39 with respect to the disk-like toothed wheel 37 and shaft 38 carrying the drum, the record 45 will be supported on the drum in a manner which will permit of readily alining the stylus 25 with the wave line 46 so that when the drum 39 is rotated the stylus will operate in the wave line 46 of the record 45, and although the wave line on the record is very fine and a single continuous line, by providing the adjustment of the drum 39 as mentioned heretofore, it will be apparent that an adjustment of the record with respect to the stylus can be easily obtained so that the pointed end of the stylus will operate in the wave line of the drum at all times. Rigidly carried on the other end of the horizontal shaft 38 and insulated therefrom, as shown in Fig. 3, is a circular circuit closing member 47 and rigidly secured on one of the uprights 35 and insulated therefrom is a brush 48 having the upper end thereof engaging the inner face of the circuit closing member 47, a similar brush 49 being supported on the same upright 35 and insulated from the upright and from the brush 48, with the upper end of the brush 49 engaging the outer face of the circuit closing member 47. Now referring to Fig. 5 it will be seen that the circuit closing member 47 is provided with a circuit breaking member 50, which may consist of a segmental piece of mica secured to the outer face of the circuit closing member or the said member may be formed on the circuit closing member in any other convenient manner, it being further apparent by referring to Figs. 4 and 5 that the outer brush 49 passes over the member 50 when the said member 47 is rotated.

Now referring to Figs. 1 and 9 it will be seen that a wire 51 extends from a switch 52, in this instance carried on the stem 53 of a steering wheel 54 of the vehicle 15, to a binding post 55 having connection with the field of the motor 32, a second wire 56 having connection with a binding post 57 of the motor 32 and with a set of batteries 58 preferably located in any convenient place on the vehicle 15. A wire 59 connects the batteries 58 with the switch 52, and a wire 60 has connection with the wire 59 adjacent the batteries 58 and is arranged for connection with a binding post 61 of the outer brush 49, while still another wire 62 connects the wire 51 with a binding post 63 carried by the brush 48.

Before proceeding to a detailed description of the operation of the device, it will be understood that the wave line 46 represents, for instance, a vocal expression or reproduction of the sound of a musical instrument so that when the record 45 is swiftly rotated, the stylus 26 of the reproducer 23, operating over the wave line of the record, will, through the medium of the phonographic reproducer, produce a sound which will be emitted from the large end of the horn 13 and which will be an actual expression of the wave line on the record. Now when the device is in initial position, it should be remembered that if, for instance, the expression "Please get out of the way" is used, the stylus 26 will lie on the wave line 46 at a point immediately preceding the waves which are to produce the first word of the expression, and when the stylus is in this position the brush 49 will engage and lie against the member 50 of the circuit closing member 47 carried on the shaft 38. Now when it is desired to produce the expression and have the same emitted from the large end of the horn 13 as a signal or alarm, the switch 52 is closed, thus completing the circuit from the switch to the batteries and the motor 32 so that the motor will be operated and rotation imparted to the shaft 34. Now as the shaft rotates the toothed wheel 36 will be rotated and, through the medium of the toothed wheel 37, will impart rotation to the shaft 38, thus rotating the drum 39 carrying the cylinder record 45 and also rotating the circuit closing member 47. In the initial rotation of the said member 47 it will be plainly seen by referring to Fig. 5, that the member 50, rotating with the circuit closing member, will pass beyond the brush 49 so that the brush will engage the outer face of the circuit closing member and at the moment that the brush engages the outer face another electrical circuit will be closed between the motor 32, the batteries 58 and the circuit closing member 47 so that if the switch 52 is released at this moment the shaft 38 will continue to revolve in view of the second circuit being closed, as mentioned. It will, therefore, be apparent that the object in providing the two electrical circuits is to initially rotate the circuit closing member 47 when the switch 52 is closed, while the provision of the second circuit will result in the continued rotation of the circuit closing member 47 after the switch 52 has been released and normally returns to an open or broken position. Now at the moment the circuit breaking member 50 of the member 47 passes beyond the brush 49, the brush 49, as well as the brush 48, will engage the outer and inner faces respectively of the circuit closing member 47, thus resulting in the continued rotation of the said member and the continued rotation of the drum 39 so that the pointed end of the stylus 26 of the reproducer 23, operating over the wave line of the cylinder record, will produce the desired expression without necessitating the operator retaining his hand on the switch 52. At the moment the expression has been emitted from the large end of the horn 13, and the last sound of the expression has been completed, the drum 39 will have made a complete revolution and in consequence thereof the circuit closing member 47 having made a complete revolution, the circuit breaking member 50 will again be brought into engagement with the brush 49, thus breaking the second electrical circuit and resulting in the discontinuance of the rotation of the drum 39 and circuit closing member. It will now be apparent that the entire device is again at its initial position and in order to again produce the expression it is only necessary to close the switch 52 to initially rotate the member 47, after which, when the switch is released to break the first electrical circuit, the circuit breaking member 47 will continue its rotation, thus rotating the drum 39 and the cylinder record 45 so that the expression will be again repeated through the medium of the reproducer 23 and the stylus 26 thereof, operating over the wave line 46 on the cylinder record. Therefore, each time that the switch 52, carried by the steering mechanism of the vehicle is closed, the expression "Please get out of the way," or any other sound or expression which it may be desired to reproduce with the particular record, will be emitted from the horn 13 to act as an alarm or signal to a pedestrian standing or passing in front of the vehicle as it advances along the highway.

In Fig. 10 we disclose a modified form of circuit closing member and in which, in place of the circuit closing member 47, we provide a circular disk 64 similar to the member 47 and carried on the same shaft 38 thereof but adapted to take the place of the member 47 on the machine described, the said disk having a cut away portion 65 constituting a circuit breaking portion and adapted to perform the same function as the circuit breaking member 50 of the circuit closing member 47. It will therefore be readily apparent that whether the circuit closing member 47 is employed or whether the circuit closing member disclosed in Fig. 10 is employed in connection with the machine, each of the said circuit closing members will embody a circuit breaking portion adapted to break the second electrical circuit in order that the phonographic record 45 will resume a stationary position after making one complete revolution.

From the foregoing description it will therefore be seen that we provide a simple device, compact in form and easily operable to produce an alarm and it should be particularly noted that in the device described neither the reproducer 23 or the drum 39 and record 45 are capable of a longitudinal movement when the device is in operation, the reproducer being simply adapted to turn and the drum and record to rotate. By providing the adjustment of the drum described heretofore, the cylinder record can be so arranged upon the drum and with respect to the point of the needle that the needle will not deviate from the wave line of the record when rotation is imparted to the record. Therefore, with a device of the character described it is only necessary to close the switch 52 for a moment in order to produce the desired result, this being accomplished through the medium of two electrical circuits, one of which constitutes an initial circuit for initially rotating the record and the other of which constitutes a final circuit for continuing the rotation of the record to result in a complete revolution of the record so that the needle of the reproducer will operate over the entire continuous wave line of the record.

As mentioned heretofore, the record may be constructed for the purpose of reproducing the voices of human beings, bells, whistles, chimes or any other sounds, which may be deemed appropriate as an alarm or signal, particularly when the device is used on vehicles such as automobiles and the like.

Having thus described our invention, we claim:

1. In a signal, the combination, of a support, a shaft journaled thereon, a drum carried by the shaft for supporting a record tablet, a reproducer including a stylus operable over the said drum, a member carried on the shaft and in juxtaposition to the said drum, and a plurality of means operable on the drum and engaging the member for adjusting the said drum relatively to the said stylus.

2. In a signal, the combination, of a support, a shaft journaled thereon, a drum carried by the shaft for supporting a record tablet, a reproducer including a stylus operable over the said drum, a toothed wheel carried by the shaft, a motor, means connecting the motor with the toothed wheel to impart rotation to the drum, and means carried by the drum and engaging the toothed wheel for adjusting the said drum relatively to the said stylus.

3. In a signal, the combination, of a support, a shaft journaled thereon, a drum carried by the shaft for supporting a record tablet, a reproducer including a stylus operable over the said drum, a toothed wheel carried by the shaft, a motor, means connecting the motor with the toothed wheel to impart rotation to the drum, and a series of set screws adjustably carried on the drum and engaging the toothed wheel for varying the position of the drum relatively to the said toothed wheel.

4. In a signal, the combination, of a support, a shaft journaled thereon, a drum carried by the shaft for supporting a record tablet, a reproducer including a stylus operable over the said drum, a toothed wheel carried by the shaft, a motor, means connecting the motor with the toothed wheel to impart rotation to the drum, a series of set screws adjustably carried on the drum and engaging the toothed wheel for varying the position of the drum relatively to the said toothed wheel, and means centrally arranged on the drum and having connection with the shaft for varying the space between the said drum and the said shaft.

5. In a signal, the combination of a drum for supporting a record tablet, a reproducer including a stylus operable over the drum, a revoluble member supporting the drum, and means connecting the revoluble member with the drum for adjusting the drum in a plurality of planes at an angle to each other and to the said stylus.

6. In a signal, the combination of a record tablet supporting drum, a reproducer including a stylus operable over the drum, a revoluble member having the drum supported on one side thereof, means for adjusting the drum in a plane at right angles to the vertical plane of the stylus and the plane of the said revoluble member, and means for adjusting the drum in a direction at an angle to the plane of the first mentioned adjustment.

In testimony whereof we affix our signatures in presence of two witnesses.

ALBERT L. MAILLARD.
LOUIS H. CROOK.

Witnesses:
  James A. Koehl,
  Geo. Ackman, Jr.